(12) United States Patent
Yamauchi et al.

(10) Patent No.: US 9,863,461 B2
(45) Date of Patent: Jan. 9, 2018

(54) CABLE GUARD STRUCTURE FOR LOCKING MECHANISM OF VEHICLE, AND VEHICLE INCLUDING SAME

(71) Applicant: HONDA MOTOR CO., LTD., Minato-Ku, Tokyo (JP)

(72) Inventors: Yohei Yamauchi, Wako (JP); Haruka Tsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 477 days.

(21) Appl. No.: 14/470,252

(22) Filed: Aug. 27, 2014

(65) Prior Publication Data

US 2015/0059514 A1    Mar. 5, 2015

(30) Foreign Application Priority Data

Aug. 30, 2013 (JP) .................................. 2013-179266

(51) Int. Cl.
*F16C 1/14* (2006.01)
*F16C 1/20* (2006.01)

(52) U.S. Cl.
CPC .................. *F16C 1/14* (2013.01); *F16C 1/20* (2013.01); *Y10T 74/20456* (2015.01)

(58) Field of Classification Search
CPC .................................. B60K 12/05; F16C 1/14
USPC ....................................... 296/97.22; 180/69.4
See application file for complete search history.

(56) References Cited

U.S. PATENT DOCUMENTS

| | | | | |
|---|---|---|---|---|
| 5,538,312 A * | 7/1996 | Lehmkuhl | ................. | B60J 5/06 280/853 |
| 5,769,481 A * | 6/1998 | Cooper | ...................... | B60J 5/06 296/155 |
| 6,234,557 B1 * | 5/2001 | Bae | ..................... | B60K 15/0406 220/86.2 |
| 6,793,266 B2 * | 9/2004 | Park | ....................... | B60K 15/05 220/86.2 |
| 6,808,226 B2 * | 10/2004 | Hirano | ....................... | B60J 5/06 292/DIG. 46 |
| 7,766,410 B2 * | 8/2010 | Tseng | ..................... | B60K 15/05 296/97.22 |
| 8,616,609 B2 * | 12/2013 | Ogata | .................... | B60K 15/05 296/97.22 |
| 8,985,668 B2 * | 3/2015 | Ogata | ...................... | F16J 15/02 220/86.2 |
| 2002/0166709 A1 * | 11/2002 | Michisaka | ............. | B62K 11/10 180/219 |

(Continued)

FOREIGN PATENT DOCUMENTS

JP    2006-281919 A    10/2006

*Primary Examiner* — Joseph M Rocca
*Assistant Examiner* — Marlon A Arce
(74) *Attorney, Agent, or Firm* — Carrier Blackman & Associates, P.C.; Joseph P. Carrier; Jingli Wang

(57) ABSTRACT

In a cable guard structure for a locking mechanism in which a lid hook is engaged with a first swing member to lock a fuel lid, and the locking of the fuel lid is released by a release operation through a cable connected to the side of the vehicle body side locking member, the first swing member is disposed at the general center of a vehicle body. The cable is routed in vehicle in a vertical direction. A cable guide guides the cable. The cable guide is a long tubular member, and is arranged substantially vertically. The cable is passed through the cable guide. Such cable guard structure for a locking mechanism can prevent access to a cable from the outside.

17 Claims, 10 Drawing Sheets

(56) References Cited

U.S. PATENT DOCUMENTS

2005/0230999 A1* 10/2005 Seto .................. B60K 15/05
                                                  296/97.22
2016/0137249 A1* 5/2016 Sasage .................. B62J 6/18
                                                  180/219

* cited by examiner

CABLE GUARD STRUCTURE FOR LOCKING MECHANISM OF VEHICLE, AND VEHICLE INCLUDING SAME

CROSS-REFERENCE TO RELATED APPLICATIONS

The present invention claims priority under 35 USC 119 based on Japanese Patent Application No. JP 2013-179266, filed on Aug. 30, 2013. The entire subject matter of this priority document, including specification claims and drawings thereof, is incorporated by reference herein.

BACKGROUND OF THE INVENTION

1. Field of the Invention

The present invention relates to a cable guard structure for a locking mechanism of a vehicle used for protecting a cable connected to the locking mechanism. More particularly, the present invention relates to a cable guard structure for a locking mechanism of a vehicle, in which a vehicle body side locking member of the locking mechanism is arranged at a substantially central portion a vehicle body, and to a vehicle including the same.

2. Description of the Background Art

There is known a structure in which a cable is connected to a seat lock device for locking an openable seat and is routed along the root portion of a grab rail. See, for example, Japanese Patent Laid-Open No. 2006-281919.

In the Japanese Patent Laid-Open No. 2006-281919, the grab rail is a component part disposed on the outside of a vehicle body, that is, it is located at a position easily vandalized from the outside. It is desirable, therefore, to route the cable at the center of the vehicle body.

The present invention has been made in view of such a situation. Accordingly, it is one of the objects of the present invention to provide a cable guard structure for a locking mechanism that can suppress access to a cable from the outside.

SUMMARY OF THE INVENTION

Reference numbers are included in the following description corresponding to the reference numbers used in the drawings. Such reference numbers are provided for purposes of illustration, and are not intended to limit the invention.

In order to achieve the above objects, the present invention according to a first aspect thereof is characterized in that, in a cable guard structure for a locking mechanism of a vehicle in which a lid (52) is locked by engaging a lid side locking member (63) with a vehicle body side locking member (66) (also referred to as a first swing member (66)), and the locking of the lid (52) is released by operation via a cable (53) connected to the side of the vehicle body side locking member (66), the vehicle body side locking member (66) is disposed at a general center of the vehicle body, the cable (53) is routed in a vertical direction in the vehicle, a cable guide (54) guiding the cable (53) is arranged a vertically long tubular member, and the cable (53) is passed through the cable guide (54). In other words, vehicle body side locking member (66) is disposed at a substantially central portion of the vehicle body.

The present invention according to a second aspect thereof is characterized in that the cable (53) may be vertically routed in space behind a head pipe (13) and in front of a fuel tank (19), and between a pair of left and right main frames (14, 14) joined to the head pipe (13).

The present invention according to a third aspect thereof is characterized in that the cable (53) and the cable guide (54) may be arranged to extend downward along a key cylinder (45A) disposed vertically long and in front of the fuel tank (19).

The present invention according to a fourth aspect thereof is characterized in that the cable guide (54) may be integrally installed on a longitudinal wall (51C) on which the vehicle body side locking member (66) is attached.

The present invention according to a fifth aspect thereof is characterized in that an eaves portion (51G) which covers above the vehicle body side locking member (66) may be installed at an upper end portion of the longitudinal wall (51C), and a guard portion (51H) may be vertically swingably installed at the leading end of the eaves portion (51G).

The present invention according to a sixth aspect thereof is characterized in that the longitudinal wall (51C), the eaves portion (51G) and the guard portion (51H) may be installed integrally with one another.

The present invention according to a seventh aspect thereof is characterized in that bulging walls (51D, 51E) may be arranged on both sides of the longitudinal wall (51C).

The present invention according to a eighth aspect thereof is characterized in that the eaves portion (51G) may be provided with an opening (51r) through which the lid side locking member (63) can be inserted.

Effects of the Invention

According to the present invention, the vehicle body side locking member is disposed at the general center of the vehicle body, the cable is routed in the vertical direction, the cable guide for guiding the cable is a long tubular member arranged vertically, and the cable is passed through the cable guide. Therefore, the tubular cable guide guards the cable extending from the vehicle body side locking member disposed at the general center of the vehicle body. Thus, it is possible to suppress access to the cable from the outside, so that it is possible to more reliably prevent the cable from being vandalized.

The cable is vertically routed in the space behind the head pipe and in front of the fuel tank, and between the pair of left and right main frames joined to the head pipe. Therefore, the cable is routed in the space surrounded by the head pipe, the fuel tank and the main frames. Thus, it is possible to prevent the cable from being vandalized.

The cable and the cable guide are arranged to extend downward along the key cylinder disposed vertically along and in front of the fuel tank. Therefore, the key cylinder and the cable guide are disposed close to each other, so that the front portion of the vehicle body can be downsized.

The cable guide is integrally installed on the longitudinal wall on which the vehicle body side locking member is arranged. Therefore, the number of component parts can be reduced, so that costs of the structure for protecting the cable can be suppressed.

The eaves portion which covers from above the vehicle body side locking member is installed at the upper end portion of the longitudinal wall and the guard portion is vertically swingably installed at the leading end of the eaves portion. Therefore, the eaves portion can protect from above the locking mechanism including the vehicle body side locking member and the connecting portion of the cable to the side of the vehicle body side locking member. In addition, the guard portion can be swung downward to cover the locking mechanism including the vehicle body side locking member also from the front of the vehicle body.

The longitudinal wall, the eaves portion and the guard portion are installed integrally with one another. Therefore, the number of component parts can be reduced to suppress costs of the structure for protecting the cable.

The bulging walls are arranged on both sides of the longitudinal wall. Therefore, the bulging walls can protect from both sides the locking mechanism and the connecting portion of the cable to the locking mechanism.

The eaves portion is provided with the opening through which the lid side locking member can be inserted. Therefore, while covering the vehicle body side locking member from above, the eaves portion can be formed with the opening through which the lid side locking member is inserted. In other words, one and the same member can have a plurality of functions. Thus, the number of component parts can be reduced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, the descriptions of directions such as front, rear or back, left, right, upside and downside in the explanation shall be the same as those with respect to a vehicle body unless otherwise noted. In the figures, symbol FR denotes the front of the vehicle body, UP denotes the upside of the vehicle body and LE denotes the left of the vehicle body.

Figure 1:
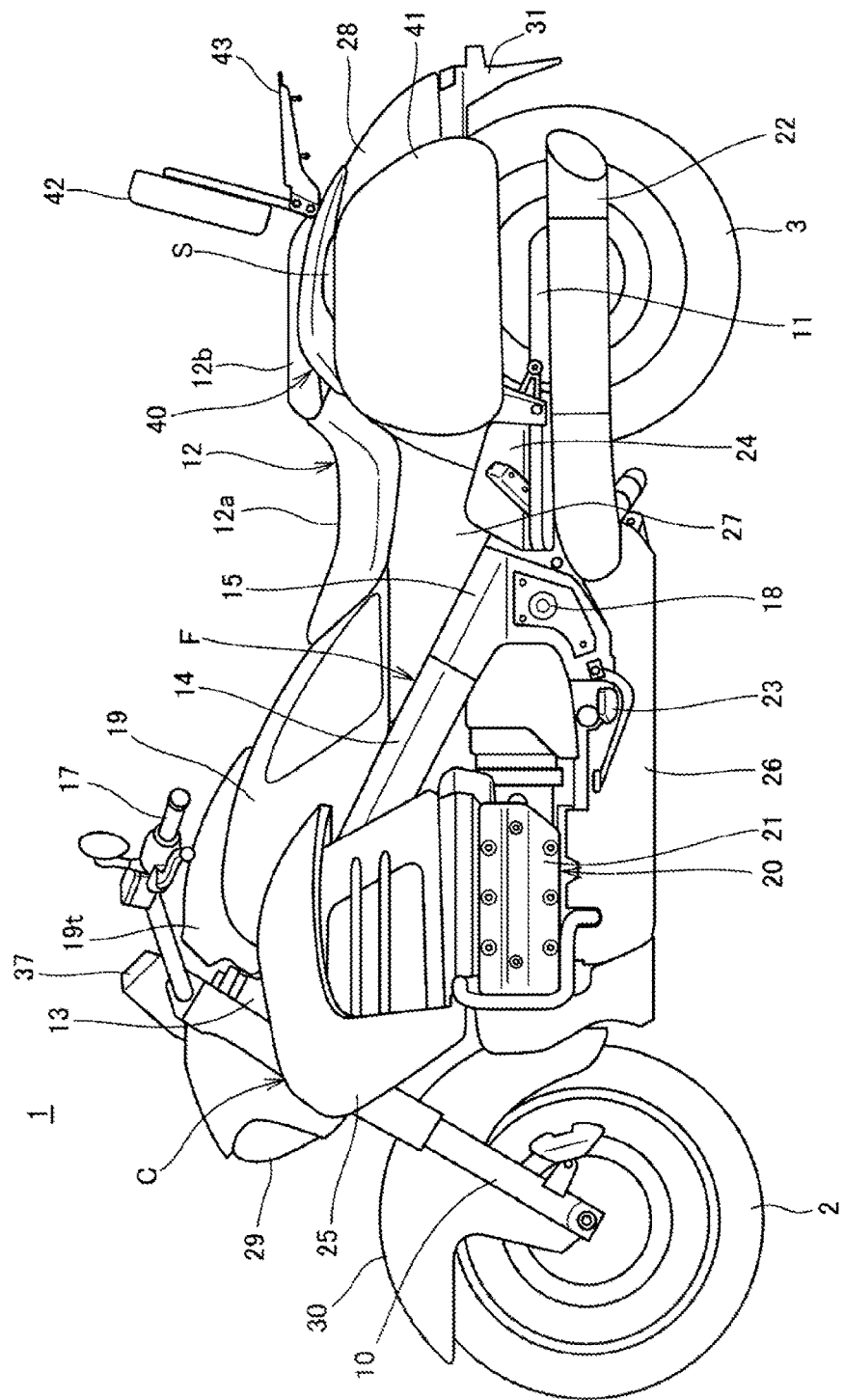
FIG. 1 is a left lateral view of a motorcycle which employs a cable guard structure for a locking mechanism according to one embodiment of the present invention.

FIG. 1 is a left lateral view of a motorcycle 1 which employs a cable guard structure for a locking mechanism according to an illustrative embodiment of the present invention.

The motorcycle 1 is a saddle-ride type vehicle in which an engine 20 is supported below a body frame F, a front fork 10 supporting a front wheel 2 is steerably supported at the front end of the body frame F and a swing arm 11 supporting a rear wheel 3 is installed on the rear side of the body frame F. In addition, the motorcycle 1 is such that a seat 12 on which an occupant sits is installed above the body frame F. The body frame F is partially covered by a resin-made body cover C.

The body frame F includes a head pipe 13 installed at the front end thereof; a pair of left and right main frames 14 slantly extending rearward and downward from the head pipe 13; a pair of left and right center frames 15 located at the anteroposterior center of the vehicle and extending downward from the corresponding rear ends of the main frames 14; and a pair of left and right seat rails (not shown) extending rearward and upward from the corresponding upper portions of the center frames 15 to the rear portion of the vehicle.

The front fork 10 is turnably supported by the head pipe 13. The front wheel 2 is supported by the lower end of the front fork 10. A handlebar 17 is secured to the upper end of the front fork 10.

The swing arm 11 is turnably supported by a pivot shaft 18 inserted through the center frames 15 in the vehicle-width direction. The rear wheel 3 is supported by the rear end of the swing arm 11.

The engine 20 is a multiple-cylinder horizontal opposed four-cycle engine. A crankshaft (not shown) is disposed to be oriented in an anteroposterior direction. A cylinder portion 21 protrudes horizontally in a left-right direction. An exhaust pipe (not shown) of the engine 20 is extended from the lower portion of the cylinder portion 21, passing below the engine 20, and is connected to mufflers 22. The mufflers 22 are arranged as a left-right pair on the side of the swing arms 11.

A fuel tank 19 is disposed above the main frames 14 and extends from the vicinity of the head pipe 13 to above the center frames 15. A tank-front cover 19t which covers the periphery of a filler opening is attached to the upper portion of the front portion of the fuel tank 19.

The seat 12 includes a front seat 12a on which a rider sits and a rear seat 12b on which a pillion passenger sits. In addition, the seat 12 is installed continuously with the rear end of the fuel tank 19 and terminates at the rear portion of the vehicle. Steps 23 for a rider are installed in front of the front seat 12a and below the center frames 15. Folding type plate-like tandem steps 24 for a pillion passenger are disposed below the rear portion of the front seat 12a.

The body cover C includes: a pair of left and right side radiator shrouds 25 which covers from the side the front portions of the main frames 14, the upper portion of the engine 20 and a radiator (not shown); an under cover 26 which covers the engine 20 from below; a pair of left and right side covers 27 which covers the lower side of the front seat 12a; and a rear cover 28 which covers the rear wheel 3 from above.

A headlight 29 is installed in front of the head pipe 13. A front fender 30 covers the front wheel 2 from above.

A grab rail 40 gripped by a pillion passenger is installed on the side of the rear seat 12b. A pair of left and right saddle bags 41 is installed below the grab rail 40 and on the side of the rear cover 28. A backrest 42 and a rear carrier 43 are installed in the rear portion of the vehicle.

Figure 2:
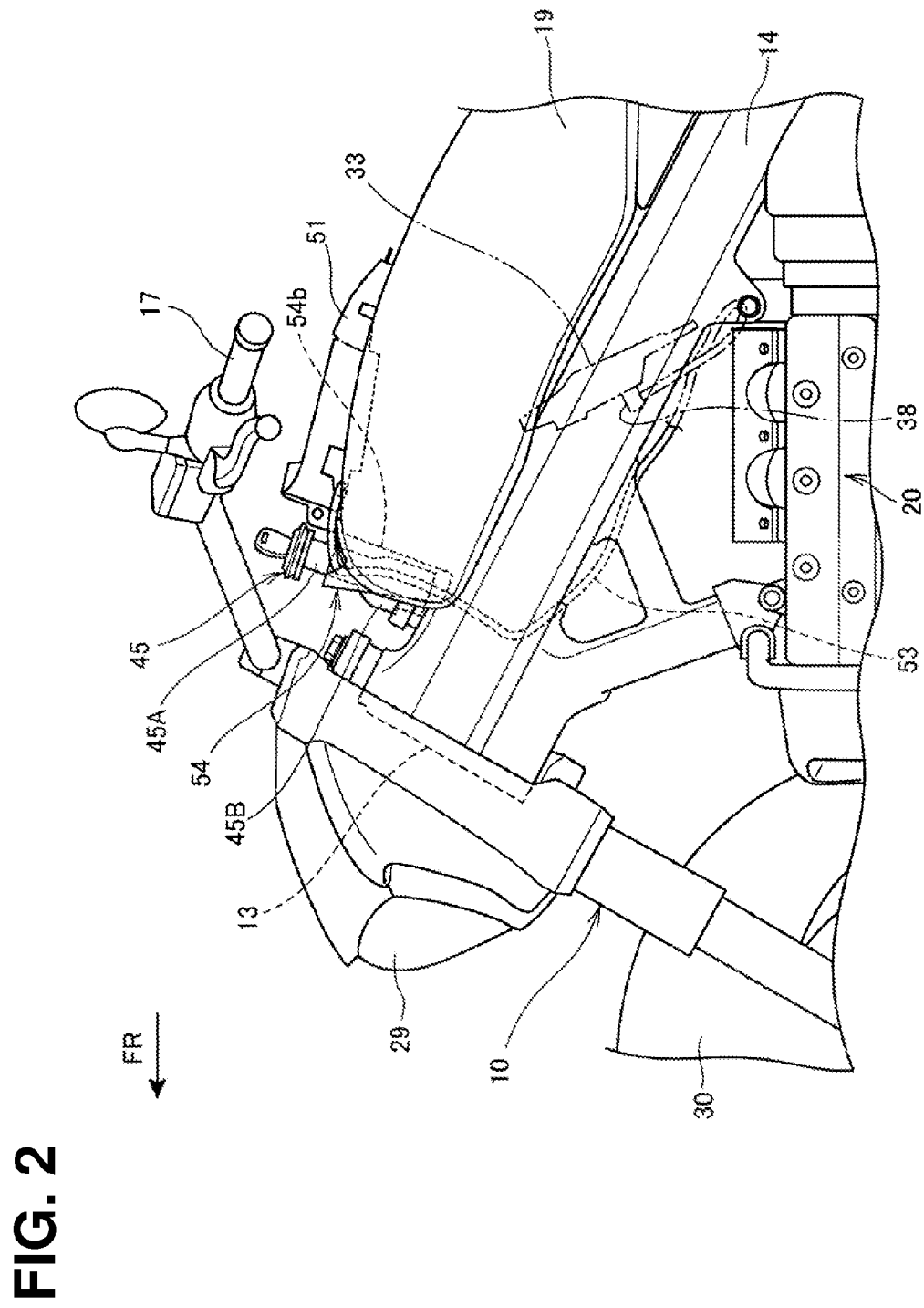
FIG. 2 is a left lateral view illustrating the front essential portion of the motorcycle.

FIG. 2 is a left lateral view illustrating a front essential portion of the motorcycle 1 with the tank-front cover 19t (see FIG. 1), a radiator and a side radiator shroud 25 (see FIG. 1) removed from the motorcycle 1. A radiator rear cover 33 is mounted on the rear portion of the side radiator shroud 25 and disposed behind the radiator.

A vertically long main switch 45 attached to the ends, close to the head pipe 13, of the left and right main frames 14 (only the main frame 14 on the front side is shown) is disposed close to the front end of the fuel tank 19. The main switch 45 includes a main key cylinder 45A provided on the upper portion thereof and an ignition switch 45B provided on the lower portion of the key cylinder 45A. The front end portion of the fuel tank 19 and the main switch 45 overlap each other as viewed from the side.

Figure 3:
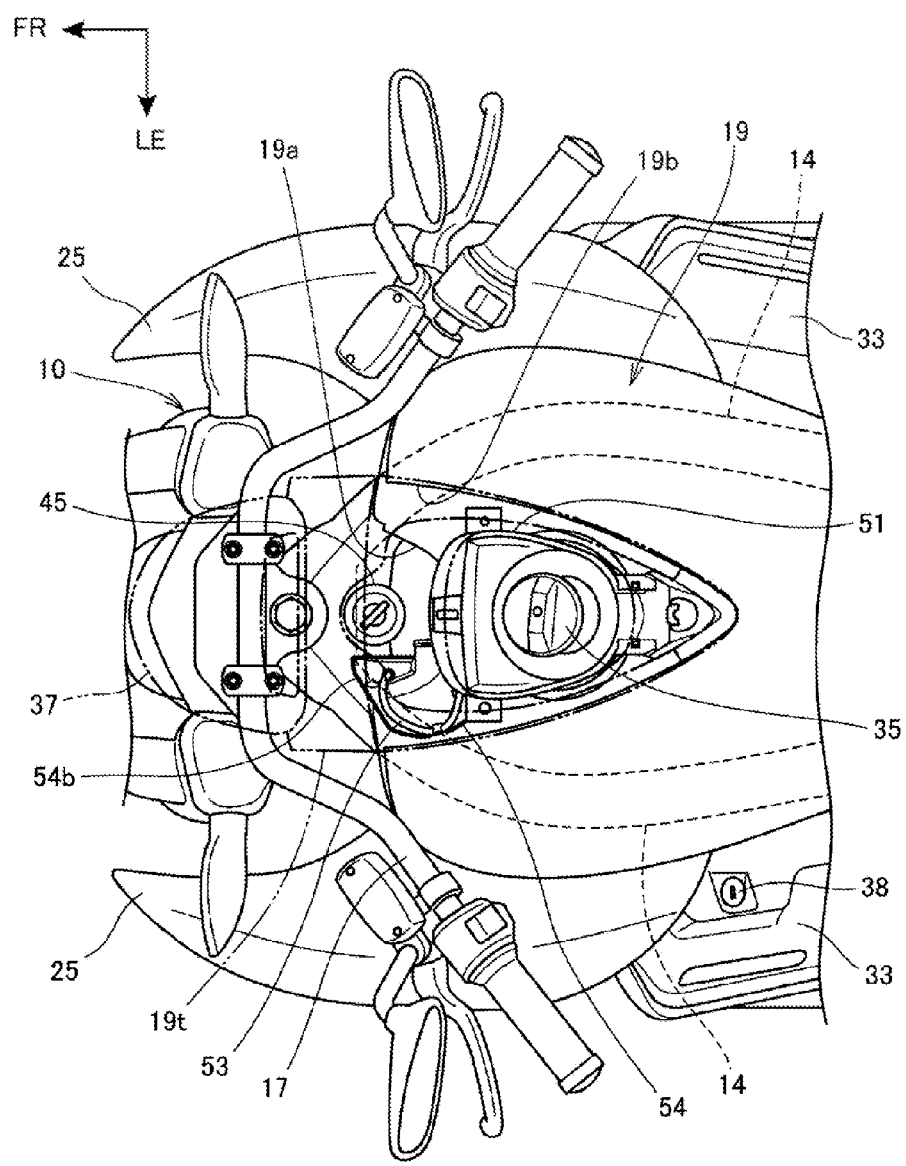
FIG. 3 is a top view illustrating the front essential portion of the motorcycle.

FIG. 3 is a top view of the front essential portion of the motorcycle 1.

A front end portion of the fuel tank 19 includes a front depression portion 19a and a front recessed portion 19b. The front depression portion 19a is concaved toward the rearward of the vehicle body. The front recessed portion 19b is formed to have a profile V-shaped to open forward and is recessed downward.

The main switch 45 is disposed inside the front depression portion 19a. A filler opening (not shown) is provided in the front recessed portion 19b and is closed by a filler cap 35. A fuel-receiving member 51 and the tank-front cover 19t are disposed in the front recessed portion 19b around the filler opening and the filler cap 35. The fuel-receiving member 51 is adapted to receive fuel flowing outward of the filler opening. The tank-front cover 19t is formed to surround the fuel-receiving member 51 and the main switch 45. A meter 37 attached above the front fork 10.

Figure 4:
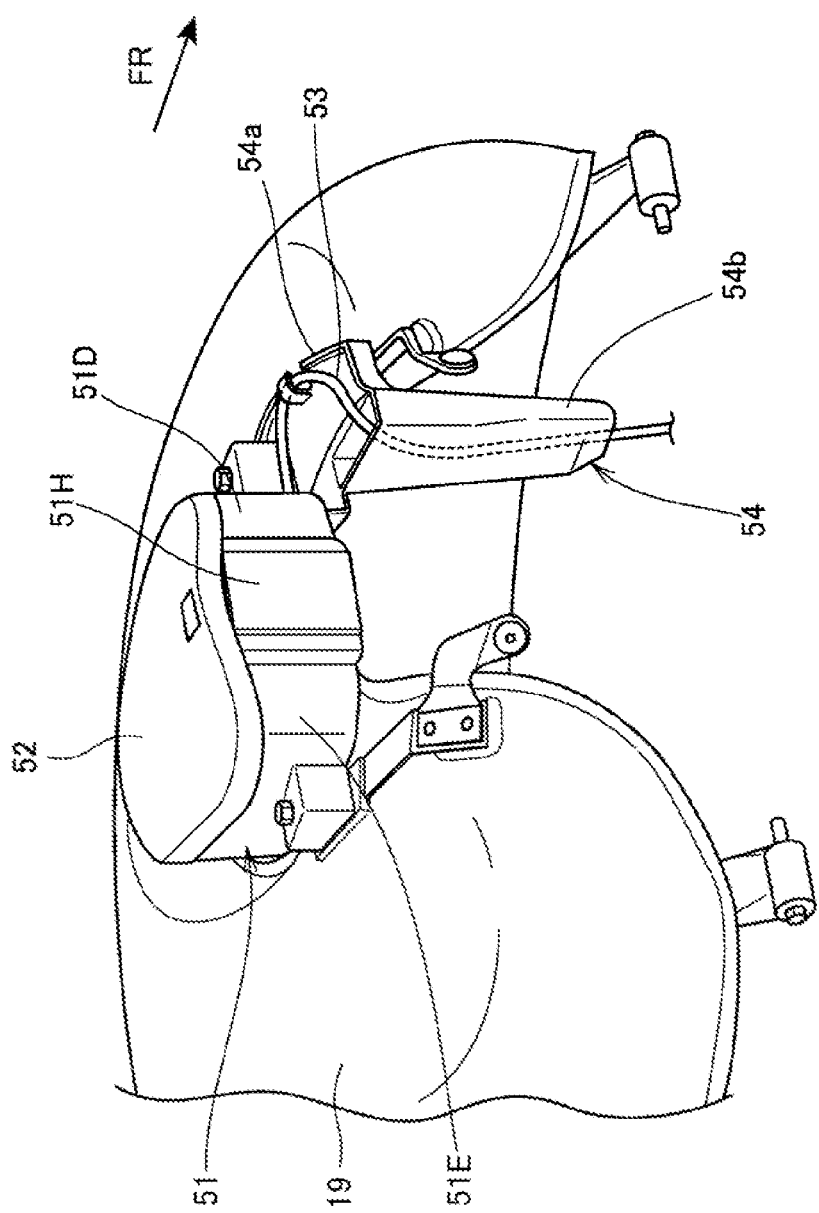
FIG. 4 is a perspective view illustrating the front portion of a fuel tank and the periphery thereof.

FIG. 4 is a perspective view illustrating the front portion of the fuel tank 19 and the periphery thereof.

A fuel lid 52 is attached in an openable manner to the fuel-receiving member 51 disposed in the front upper portion of the fuel tank 19. The fuel lid 52 covers from above the filler opening (not shown) and the filler cap 35 (see FIG. 3) for closing the filler opening. The fuel-receiving member 51 is provided with a locking mechanism (described later) which locks the fuel lid 52 so as to make it possible not to open the fuel lid 52 in the closed state. The locking mechanism is connected to a lock-releasing key cylinder 38 (see FIG. 3) by a cable 53. The lock-releasing key cylinder 38 is provided in the radiator rear cover 33 located on the side portion of the vehicle body. The cable 53 is passed along the way through a tubular cable guide 54 formed integrally with the fuel-receiving member 51. A main arrangement route of the cable 53 is shown in FIG. 2.

As shown in FIGS. 2 and 3, the main switch 45 is disposed between the head pipe 13 and the fuel tank 19. A downward extending portion 54b forming the lower portion of the cable guide 54 extends vertically along the vertically long main switch 45 and is disposed close to the left side of the main switch 45.

The cable 53 extends vertically along the main key cylinder 45A of the main switch 45 in the downward extending portion 54b of the cable guide 54. Further, the cable 53 vertically extends between the left and right main frames 14 below the cable guide 54. Also, the cable 53 extends reward obliquely and downward along the lower edge of the main frames 14 from the vicinity of the lower edge of the main frames 14. Also, the cable 53 makes a U-turn and terminates at the lock-releasing key cylinder 38 below the radiator rear cover 33.

Figure 5:
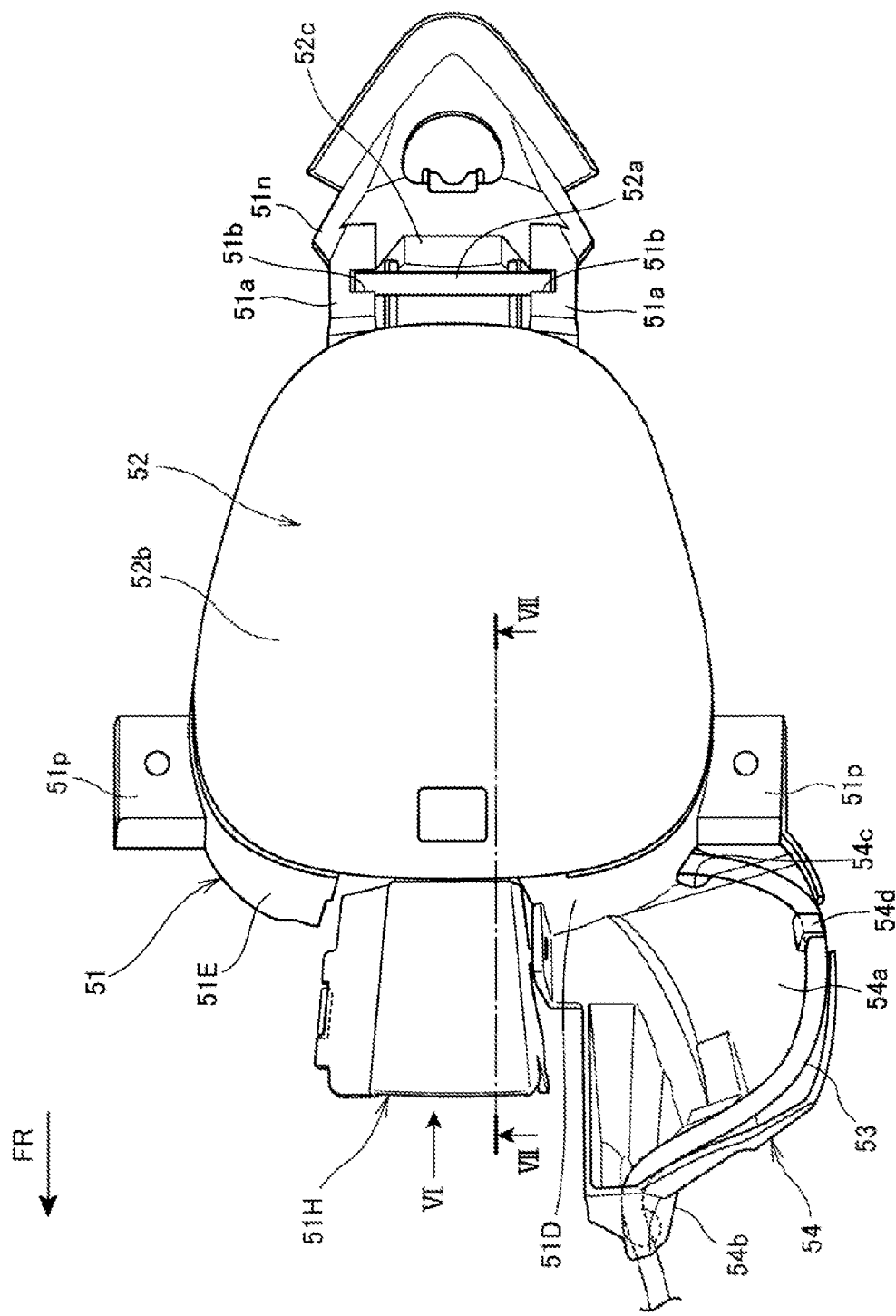
FIG. 5 is a top view of a fuel-receiving member and a fuel lid.

FIG. 5 is a top view illustrating the fuel-receiving member 51 and the fuel lid 52.

The fuel lid 52 is supported by the rear portion of the fuel-receiving member 51 so as to be openable around a shaft portion 52a as a swing shaft installed on the fuel lid 52.

The fuel-receiving member 51 is formed on the left and right of the rear portion thereof with a pair of left and right bulging portions 51a bulging upward. The pair of bulging portions 51a is formed with respective groove portions 51b extending in the vehicle-width direction.

The fuel lid 52 includes a lid body 52b formed into a generally trapezoidal shape as viewed from the above; a rearward extending portion 52c formed integrally with the rear portion of the lid body 52b so as to extend rearward; and the shaft portion 52a formed integrally with the rearward extending portion 52c so as to be extended in the vehicle-width direction. The shaft portion 52a is turnably fitted into the groove portions 51b of the fuel-receiving member 51.

Figure 6:
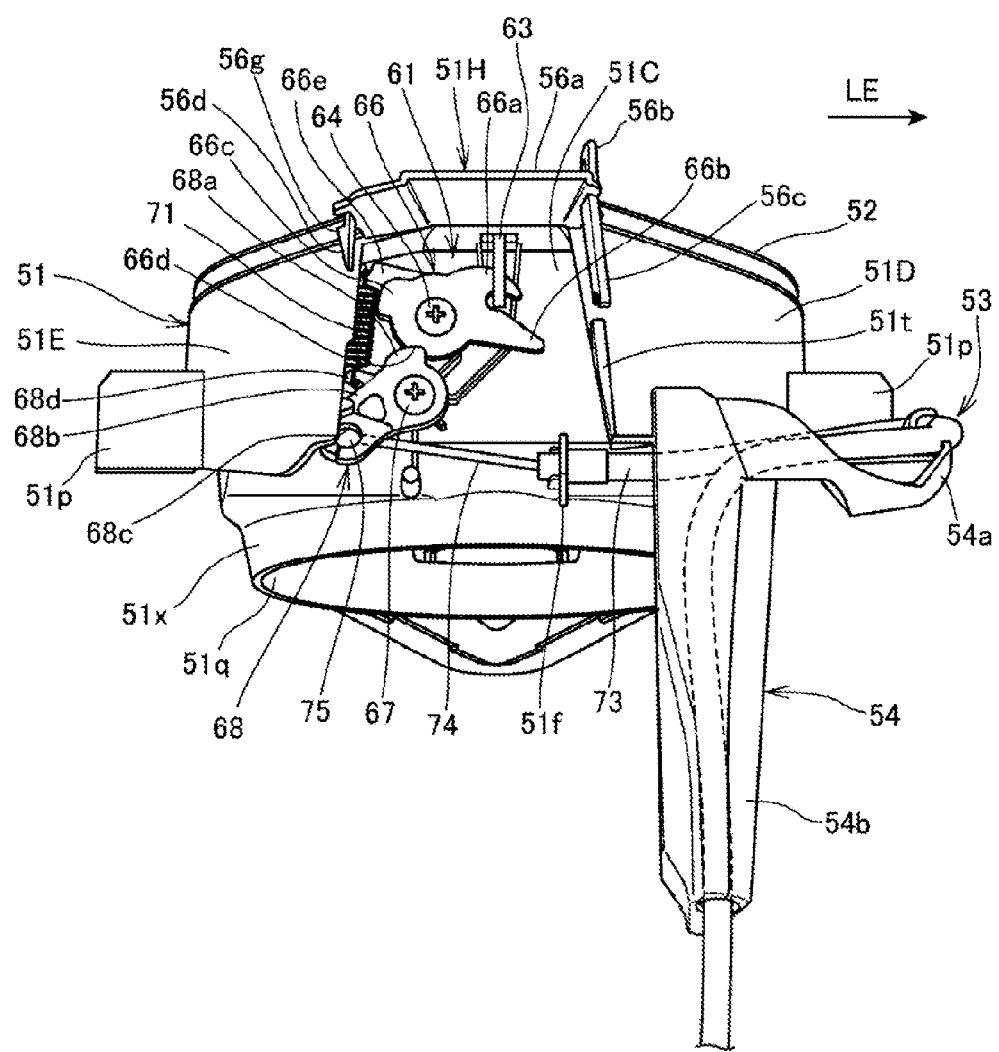
FIG. 6 is a view as viewed from arrow VI in FIG. 5.

FIG. 6 is a view as viewed from arrow VI in FIG. 5.

A locking mechanism 61, which locks the fuel lid 52 so as not to be opened in the closed state, is installed on a longitudinal wall 51C of the front portion of the fuel-receiving member 51. A pair of bulging walls 51D and 51E is installed on the front portion of the fuel-receiving member 51. The bulging walls 51D and 51E bulge forward from the longitudinal wall 51C and cover from the front the respective left and right ends of the longitudinal wall 51C.

The locking mechanism 61 includes a first swing member 66 (also referred to as a vehicle body side locking member 66), a second swing member 68 and an extension coil spring 71. The first swing member 66 is swingably attached to the longitudinal wall 51C by means of a screw 64 to interlock with a lid hook 63. The lid hook 63 is installed on the fuel lid 52 so as to project downward. The second piece 68 is swingably attached to the longitudinal wall 51C by means of a screw 67 to restrict the swing of the first swing member 66. The extension coil spring 71 is spanned between the first swing member 66 and the second swing member 68.

The first swing member 66 includes: an engaging claw portion 66a hooked on the lid hook 63; a first projecting portion 66b installed close to the engaging claw portion 66a; a second projecting portion 66c formed on a side opposite the first projecting portion 66b with respect to the screw 64; an engaging recessed portion 66d formed at an edge between the first projecting portion 66b and the second projecting portion 66c; and a spring-hooking portion 66e hooked on one end of the extension coil spring 71.

The second swing member 68 includes an engaging projecting portion 68a engaged with the engaging recessed portion 66d of the first swing member 66; an arm portion 68b extending from the screw 67 toward the radial outside; a wire retaining portion 68c formed at the leading end of the arm portion 68b; and a spring-hooking portion 68d extending laterally from the arm portion 68b and hooking the other end of the extension coil spring 71.

FIG. 6 illustrates a state where the engaging claw portion 66a of the first swing member 66 engages the lid hook 63. In this case, the engaging projecting portion 68a of the second swing member 68 engages the engaging recessed portion 66d of the first swing member 66, so that the second swing member 68 restricts the turning of the first swing member 66. Thus, the fuel lid 52 is maintained in the locked state.

The cable 53 has one end retained on the wire-retaining portion 68c of the second swing member 68.

More specifically, the cable 53 includes: an outer cable 73 forming an outer layer; an inner wire 74 movably inserted into the inside of the outer cable 73; and a cylindrical end member 75 attached to the leading end of the inner wire 74. The end member 75 is retained on the wire-retaining portion 68c. The outer cable 73 is supported at a leading end thereof by a cable support portion 51f formed integrally with the longitudinal wall 51C.

The cable 53 generally horizontally extends from the side of the locking mechanism 61 and the longitudinal wall 51C, makes a turn at the upper portion of the cable guide 54, then bends downward, passes through the inside of the cable guide 54, and extends downward from the cable guide 54. The outer cable 73 has an end portion supported by the radiator rear cover 33 (see FIG. 2). The inner wire 74 has a leading end connected to a swing arm (not shown) of the lock-releasing key cylinder 38 (see FIG. 2) installed on the radiator rear cover 33.

In the locked state of the fuel lid 52, a key is inserted into the lock-releasing key cylinder 38 and turns the swing arm to pull the inner wire 74. In this way, the second swing member 68 is turned counterclockwise, so that the engaging projecting portion 68a of the second swing member 68 is disengaged from the engaging recessed portion 66d of the first swing member 66. The first swing member 66 is turned counterclockwise by the pull force of the extension coil spring 71.

The engaging claw portion 66a of the first swing member 66 is disengaged from the lid hook 63 of the fuel lid 52. As a result, it becomes possible to open the fuel lid 52. In this case, the side edge of the second projecting portion 66c of the first swing member 66 turned counterclockwise hits the engaging projecting portion 68a of the second swing member 68. Such operation restricts the turning of the first swing member 66 and the second swing member 68.

In such state, when the fuel lid 52 is closed, the end of the lid hook 63 depresses the first projecting portion 66b of the first swing member 66. Therefore, the first swing member 66 is turned clockwise, so that the second swing member 68 is turned clockwise by the pull force of the compression coil spring 71. As a result, the engaging projecting portion 68a of the second swing member 68 engages the engaging recessed portion 66d of the first swing member 66 to bring the fuel lid 52 into the locked state.

Figure 7:
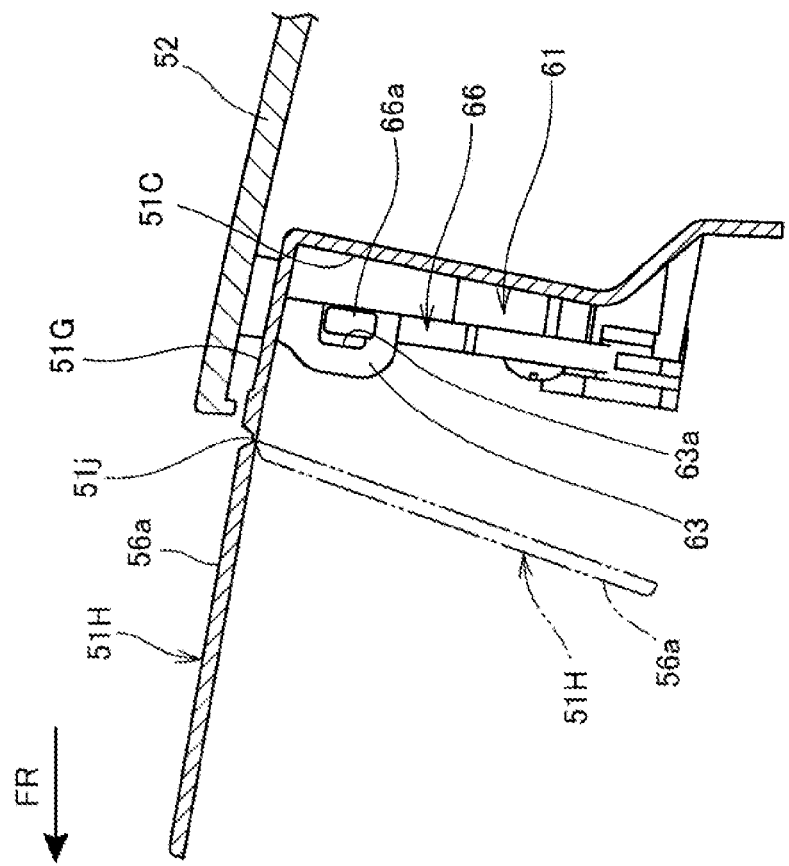
FIG. 7 is a cross-sectional view taken along line VII-VII in FIG. 5.

FIG. 7 is a cross-sectional view taken along line VII-VII in FIG. 5.

The eaves portion 51G extending toward the front of the vehicle body is integrally formed with the upper end of the longitudinal wall 51C of the fuel-receiving member 51. Further, a guard portion 51H is integrally formed from the front end of the eaves portion 51G. A thin-walled portion 51j is formed at a boundary portion between the eaves portion 51G and the guard portion 51H. The formation of the thin-walled portion 51j can swing the guard portion 51H with respect to the eaves portion 51G.

A separate lid hook 63 is attached to the front end portion of the fuel lid 52. The lid hook 63 is formed with an engaging hole 63a. The engaging claw portion 66a of the first swing member 66 of the locking mechanism 61 engages the engaging hole 63a.

Figure 8:
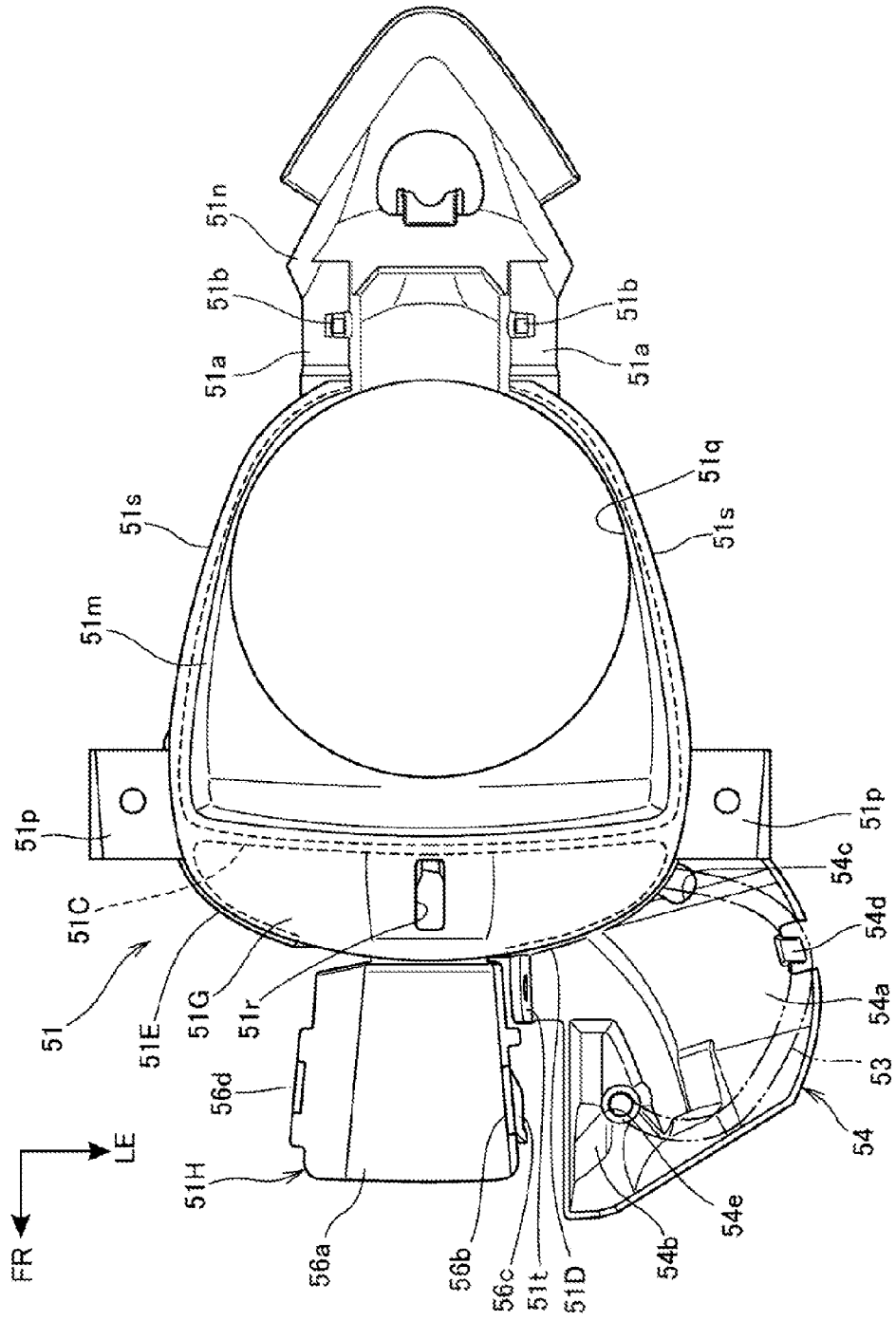
FIG. 8 is a top view of the fuel-receiving member.

FIG. 8 is a top view of the fuel-receiving member 51.

The fuel-receiving member 51 includes a fuel-receiving body 51m formed into a generally trapezoidal shape as viewed from above; a rearward extending portion 51n extending rearward from the fuel-receiving body 51m; tank-mounting portions 51p installed on the left and right of the front portion of the fuel-receiving body 51m and attached to the fuel tank 19; the guard portion 51H formed integrally with the eaves portion 51G forming the front end portion of the fuel-receiving body 51m; and the cable guide 54 formed integrally with the left portion of the front end portion of the fuel-receiving body 51m.

The fuel-receiving body 51m is formed like a downward recessed tray. The tray is formed in its bottom with a generally circular hole 51q through which the filler opening and filler cap 35 (see FIG. 3) of the fuel tank 19 (see FIG. 4) are exposed to the outside. The eaves portion 51G has a rectangular opening 51r opened to receive the lid hook 63 (see FIG. 7) of the fuel lid 52 (see FIG. 5) passed therethrough.

The longitudinal wall 51C of the fuel-receiving member 51 is formed at the largest left-right-width portion of the fuel-receiving member 51 so as to extend in the vehicle-width direction. The left and right bulging walls 51D and 51E extend along the edge portion of the eaves portion 51G from the left and right ends of the longitudinal wall 51C while curving toward the vehicle-widthwise central side of the fuel-receiving member 51.

Left and right sidewalls 51s extend from the left and right ends of the longitudinal wall 51C toward the rearward of the vehicle body along the edge portion of the fuel-receiving member 51 and terminate at the rearward extending portion 51n.

The cable guide 54 is composed of a plate-like forward and sideward extending portion 54a and a tubular downward extending portion 54b. The forward and sideward extending portion 54a extends from the front end of the fuel-receiving body 51m so as to broaden toward the front and left side of the vehicle body. The downward extending portion 54b extends downward from the front portion of the forward and sideward extending portion 54a.

The forward and sideward extending portion 54a is bored close to the bulging wall 51D with a cable insertion hole 54c through which the cable 53 is passed. In addition, the forward and sideward extending portion 54a is formed at its edge portion with a hook portion 54d for hooking and retaining the cable 53. The downward extending portion 54b is bored at a bottom portion thereof with a cable insertion hole 54e adapted to receive the cable 53 passed therethrough.

Figure 9:
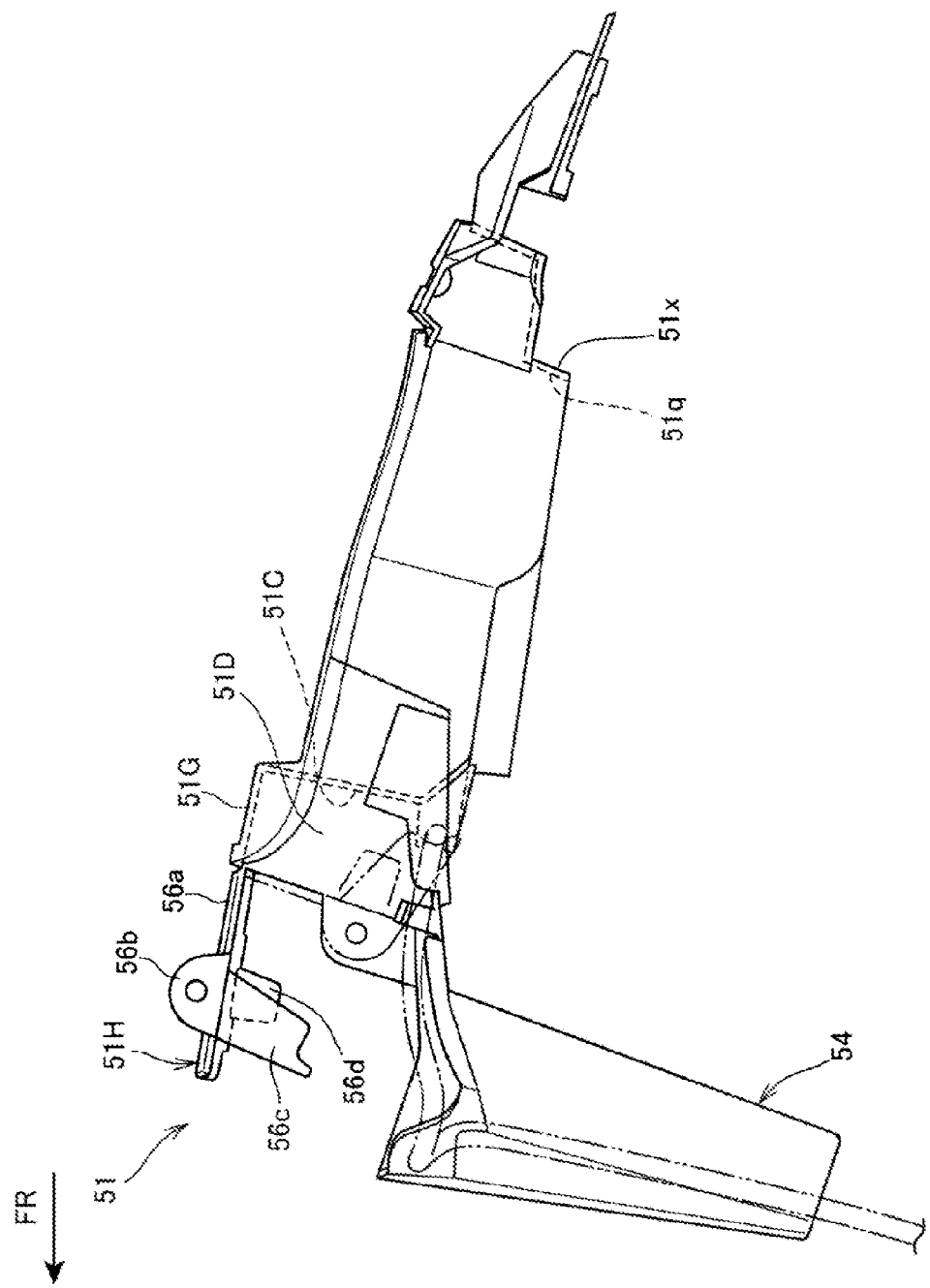
FIG. 9 is a side view of the fuel-receiving member.
Figure 10:
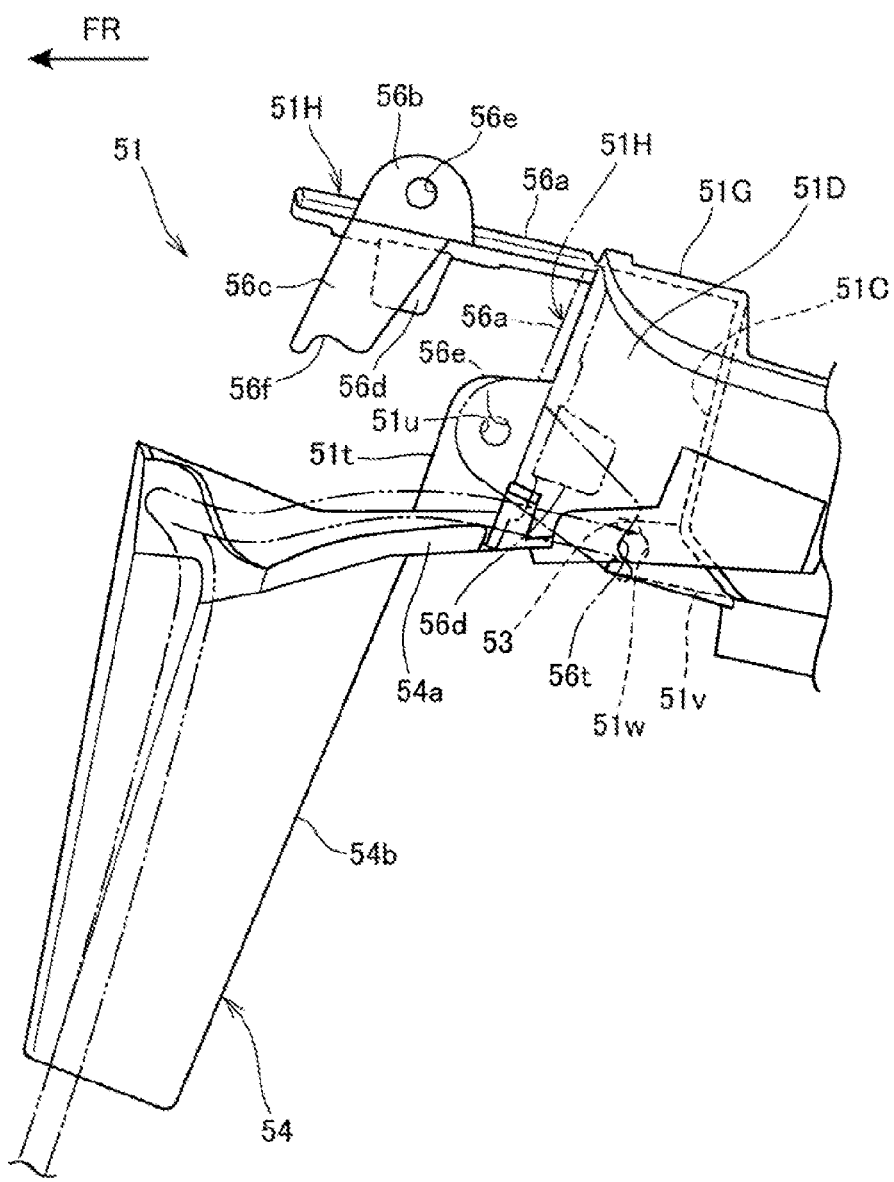
FIG. 10 is an enlarged view of an essential portion of FIG. 9.

FIG. 9 is a side view of the fuel-receiving member 51. FIG. 10 is an enlarged view of an essential portion in FIG. 9.

As shown in FIG. 9, the circular hole 51q of the fuel-receiving member 51 is formed in the lower end of a lower tubular portion 51x. The lower tubular portion 51x integrally projects from the lower portion of the fuel-receiving member 51.

Referring to FIGS. 6 and 10, in the state of being originally formed, the guard portion 51H includes a flat plate portion 56a, a left-upward projecting portion 56b, a left-downward projecting portion 56c and a right-downward projecting portion 56d. The flat plate portion 56a is generally located on the extended line of the eaves portion 51G. The left-upward projecting portion 56b integrally projects upward from the left edge of the flat plate portion 56a. The left-downward projecting portion 56c integrally projects downward from the left edge of the flat plate portion 56a. The right-downward projecting portion 56d integrally projects downward from the right edge of the flat plate portion 56a.

The left-upward projecting portion 56b has an edge portion formed generally like an arc and a through-hole 56e bored in a central portion thereof. The left-downward projecting portion 56c extends so as to be inclined toward the front of the vehicle body with respect to the flat plate portion 56a. In addition, the left-downward projecting portion 56c has a leading end formed with an arcuate recessed portion 56f. The right-downward projecting portion 56d is formed at its leading end portion with a claw portion 56g projecting outward-sideward.

As shown in FIG. 10, the guard portion 51H swung downward as indicated by imaginary lines.

In this state, the flat plate portion 56a of the guard portion 51H covers the locking mechanism 61 (see FIG. 6) from the front of the vehicle body. The left-upward projecting portion 56b is located on the vehicle-widthwise inside of a first forward projecting portion 51t formed integrally with the bulging wall 51D. In addition, the left-upward projecting portion 56b overlaps the first forward projecting portion 51t as viewed in a side view. Also the through-hole 56e of the left-upward projecting portion 56b overlaps a through-hole 51u bored in the first forward projecting portion 51t. A bolt is inserted through the through-holes 56e and 51u and a nut is screwed onto the bolt. In this way, the left-upward projecting portion 56b is secured to the first forward projecting portion 51t. In other words, the guard portion 51H is secured to the bulging wall 51D.

The recessed portion 56f located at the end of the left-downward projecting portion 56c is located close to a second forward projecting portion 51v integrally projecting forward from the longitudinal wall 51C. The cable 53 is held and supported at its middle by the recessed portion 56f and an arcuate recessed portion 51w formed at the end of the second forward projecting portion 51v. In the right-downward projecting portion 56d, the claw portion 56g engages the edge of the right bulging wall 51E to prevent the guard portion 51H from being swung upward with respect to the bulging wall 51E.

As shown in FIGS. 3, 4, 6 and 10, in the vicinity of the connecting portion with the locking mechanism 61, the cable 53 is covered by the eaves portion 51G covering above the locking mechanism 61 and the guard portion 51H covering the front of the locking mechanism 61. The cable 53 is covered in the upper portion of the cable guide 54 from above by the tank-front cover 19t covering the periphery of the fuel-receiving member 51. The cable 53 is covered in the lower portion of the cable guide 54 by the tubular downward extending portion 54b from the anteroposterior direction and the left-right direction. Further, the overall cable 53 is disposed on the central side of the vehicle body. Therefore, it becomes hard to access the cable 53 from the outside. Thus, the cable 53 can be protected more reliably.

As illustrated in FIGS. 4, 6, 7 and 10, the locking mechanism 61 is arranged such that the lid hook 63 as a lid side locking member is engaged with the first swing member 66 as a vehicle-body side locking member to lock the fuel lid 52 as a lid. In addition, the locking of the fuel lid 52 is released by operation through the cable 53 connected to the side of the first swing member 66. In the cable guard structure for the locking mechanism 61, the first swing member 66 is disposed at the general center of the vehicle body. The cable 53 is routed in the vertical direction. The cable guide 54 which guides the cable 53. The cable guide 54 is a vertically long tubular member. The cable 53 is passed through the cable guide 54.

With this configuration, the cable 53 extending from the side of the first swing member 66 disposed at the general center of the vehicle body is guarded from the anteroposterior direction and the vehicle-width direction by the tubular cable guide 54. Therefore, the cable 53 can more reliably be protected from being vandalized from the outside of the vehicle body.

As illustrated in FIGS. 2 and 3, the cable 53 is vertically routed in the space behind the head pipe 13 and in front of the fuel tank 19 and between the pair of left and right main frames 14 joined to the head pipe 13. In other words, the cable 53 is routed in the space surrounded by the head pipe 13, the fuel tank 19 and the main frames 14. Thus, it is possible to satisfactorily prevent the cable 53 from being vandalized.

The cable 53 and the cable guide 54 are arranged to extend downward along the main switch 45 vertically disposed in front of the fuel tank 19, specifically, to extend downward along the vertically long main key cylinder 45A as a key cylinder. In this way, the main key cylinder 45A and the cable guide 54 are arranged close to each other. Thus, the front portion of the vehicle body can be made compact and downsized.

As illustrated in FIGS. 6, 8 and 9, the cable guide 54 is integrally installed on the longitudinal wall 51C on which the locking mechanism 61, specifically, the first swing member 66 of the locking mechanism 61 is installed. Therefore, the number of component parts can be reduced to suppress the cost of the structure for protecting the cable 53.

As illustrated in FIG. 7, the eaves portion 51G which covers above the locking mechanism 61, specifically, the first swing member 66 of the locking mechanism 61 is installed at the upper end portion of the longitudinal wall 51C. In addition, the guard portion 51H is vertically swingably installed at the leading end of the eaves portion 51G. Therefore, the eaves portion 51G can protect from above the locking mechanism 61 including the first swing member 66 as well as the side of the first swing member 66 of the cable 53, specifically, the connecting portion to the second swing member 68. The guard portion 51H can be swung downward to cover the locking mechanism 61 including the first swing member 66 also from the front of the vehicle body.

The longitudinal wall 51C, the eaves portion 51G and the guard portion 51H are installed integrally with one another. Therefore, the number of component parts can be reduced to suppress the cost of the structure for protecting the cable 53.

As illustrated in FIGS. 6, 7 and 8, the bulging walls 51D and 51E are installed on both sides of the longitudinal wall 51C. Therefore, the bulging walls 51D and 51E can protect from both sides the locking mechanism 61 and the connecting portion of the cable 53 to the locking mechanism 61.

As illustrated in FIG. 8, the eaves portion 51G is provided with the opening 51r through which the lid hook 63 can be inserted. Therefore, while covering the first swing member 66 from above, the eaves portion 51G can be formed with the opening 51r through which the lid hook 63 can be inserted. In other word, one and the same member can have a plurality of functions, so that the number of component parts can be reduced.

The illustrative embodiment described above is absolutely one aspect of the present invention and can arbitrarily be modified or applied in a range not departing from the gist of the present invention.

For example, as illustrated in FIG. 7, the separate lid hook 63 is attached to the fuel lid 52 in the embodiment described above. However, the present invention is not limited to this. The fuel lid 52 may be formed integrally with the lid hook 63.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SYMBOLS

1 Motorcycle (saddle-ride type vehicle)
13 Head pipe
14 Main frame
19 Fuel tank
45A Main key cylinder (key cylinder)
51C Longitudinal wall
51D, 51E Bulging wall
51G Eaves portion
51H Guard portion
51r Opening
52 Fuel lid (lid)
53 Cable
54 Cable guide
61 Locking mechanism
63 Lid hook (lid side locking member)
66 First swing member (vehicle body side locking member).

What is claimed is:

1. A cable guard structure for a locking mechanism of a vehicle, said vehicle comprising
a lid,
a lid hook;
a first swing member; and
a cable connected to said first swing member;
wherein said lid is locked by engaging the lid hook with said first swing member, and locking of the lid is released by a release operation via said cable connected to the first swing member,
said cable guard structure comprising:
a cable guide which guides the cable in said vehicle; wherein:
the first swing member is disposed at a general center of a vehicle body,
the cable is routed substantially in a vertical direction in said vehicle;
said cable guide is an elongate tubular member, and is arranged substantially vertically in said vehicle; and
the cable is passed through the cable guide;
wherein said vehicle further comprises a fuel tank, a head pipe, and a pair of left and right main frames joined to the head pipe;
wherein the cable is vertically routed in a space behind said head pipe and in front of the fuel tank, and between the pair of left and right main frames joined to the head pipe; and
wherein the cable guide guides a portion of the cable in the space and shields the portion of the cable from external access.

2. The cable guard structure for a locking mechanism according to claim 1,
wherein said vehicle further comprises a key cylinder disposed vertically along and in front of the fuel tank; and
wherein the cable and the cable guide are arranged so as to extend downward along said key cylinder disposed vertically along and in front of the fuel tank.

3. The cable guard structure for a locking mechanism according to claim 1, wherein:
said vehicle further comprises a fuel receiving member having a longitudinal wall;
the cable guide is integrally installed on said longitudinal wall; and
the first swing member is attached on said longitudinal wall.

4. The cable guard structure for a locking mechanism according to claim 2, wherein:
said vehicle further comprises a fuel receiving member having a longitudinal wall;
the cable guide is integrally installed on said longitudinal wall; and
the first swing member is attached on said longitudinal wall.

5. The cable guard structure for a locking mechanism according to claim 3,
wherein said fuel receiving member comprises an eaves portion which covers from above the first swing member and is installed at an upper end portion of the longitudinal wall, and
wherein the cable guard structure further comprise a guard portion which is also part of the fuel receiving member, and the guard portion is vertically swingably installed at a leading end of the eaves portion.

6. The cable guard structure for a locking mechanism according to claim 3,
wherein said fuel receiving member further comprises an eaves portion and a guard portion; the guard portion is also a component of the cable guard structure; and
wherein the longitudinal wall, the eaves portion and the guard portion are installed integrally with one another.

7. The cable guard structure for a locking mechanism according to claim 5, wherein the longitudinal wall, the eaves portion and the guard portion are installed integrally with one another.

8. The cable guard structure for a locking mechanism according to claim 3, wherein said fuel receiving member further comprises bulging walls installed on both sides of the longitudinal wall.

9. The cable guard structure for a locking mechanism according to claim 5, wherein said fuel receiving member further comprises bulging walls installed on both sides of the longitudinal wall.

10. The cable guard structure for a locking mechanism according to claim 6, wherein said fuel receiving member further comprises bulging walls installed on both sides of the longitudinal wall.

11. The cable guard structure for a locking mechanism according to claim 5, wherein the eaves portion has an opening formed therein through which the lid hook is inserted.

12. The cable guard structure for a locking mechanism according to claim 6, wherein the eaves portion has an opening formed therein through which the lid hook is inserted.

13. The cable guard structure for a locking mechanism according to claim 8, wherein said fuel receiving member further comprises an eaves portion having an opening formed therein through which the lid hook is inserted.

14. A vehicle comprising:
the cable guard structure according to claim 1;
a body frame;
a fuel receiving member disposed in a front upper portion of the fuel tank;
wherein the fuel tank is supported by said body frame;
wherein the first swing member is disposed at a substantially central portion of said body frame; and wherein the lid is attached in an openable manner to the fuel receiving member.

15. The vehicle according to claim 14, further comprising a key cylinder disposed along and in front of the fuel tank; and
wherein the cable and the cable guide are arranged to extend along said key cylinder.

16. A motorcycle comprising:
the cable guard structure according to claim 1;
a frame assembly defining a vehicle body;
a fuel receiving member disposed in a front upper portion of the fuel tank;
wherein the fuel tank is supported by said frame assembly;
wherein the first swing member is disposed at a substantially central portion of the vehicle body; and
wherein the lid is attached to the fuel receiving member.

17. The motorcycle according to claim 16,
wherein said fuel receiving member has a longitudinal wall; and
wherein the cable guide is integrally installed on said longitudinal wall.

* * * * *